United States Patent [19]
Berg et al.

[11] Patent Number: 5,981,943
[45] Date of Patent: Nov. 9, 1999

[54] ARTICULATED ROLLER REACTOR FOR PAPER FEED DEVICE

[75] Inventors: Thomas E. Berg, Ft. Collins; Ronald K. Kerschner, Loveland; Jacklyn M. Dowdy, Ft. Collins, all of Colo.

[73] Assignee: Hewlett-Packard Company, Palo Alto, Calif.

[21] Appl. No.: 09/013,130

[22] Filed: Jan. 26, 1998

[51] Int. Cl.⁶ ........................................ H04N 1/04
[52] U.S. Cl. ........................... 250/234; 250/216; 358/498
[58] Field of Search .................................... 250/234, 235, 250/216, 239; 358/493, 474, 494, 498; 235/433, 462.45, 472.01

[56] References Cited

U.S. PATENT DOCUMENTS 5,777,321  7/1998  Kerschner et al. ...................... 250/235

*Primary Examiner*—Edward P. Westin
*Assistant Examiner*—Kevin Pyo

[57] ABSTRACT

An articulated reactor may comprise a generally rectangular member having a longitudinal axis, a transverse axis, an elongate inlet side, and an elongate outlet side. A raised portion extends along a direction that is generally parallel to the longitudinal axis and at least one slot extends from about the elongate outlet side to about the elongate inlet side. The slot forms at least two fingers the raised portions of which are biased against a roller associated with a scanner device when the scanner device is positioned adjacent the articulated reactor.

17 Claims, 3 Drawing Sheets

ARTICULATED ROLLER REACTOR FOR PAPER FEED DEVICE

FIELD OF INVENTION

This invention relates to hand-held scanner devices in general and more specifically to a paper feed device for hand-held scanner devices.

BACKGROUND

Imaging devices, such as optical scanners, are well-known in the art and produce machine-readable image data signals that are representative of a scanned object, such as a photograph or a page of printed text. In a typical scanner application, the image data signals produced by an optical scanner may be used by a personal computer to reproduce an image of the scanned object on a suitable display device, such as a CRT or a printer.

A hand-held or portable optical scanner is an optical scanner which is designed to be moved by hand across the object or document being scanned. The hand-held scanner may be connected directly to a separate computer by a data cable. If so, the data signals produced by the hand-held scanner may be transferred to the separate computer "on the fly," i.e., as the image data are collected. Alternatively, the hand-scanner may include an on-board data storage system for storing the image data. The image data may then be downloaded to a separate computer after the scanning operation by any convenient means, such as via a cable or an optical infrared data link.

Hand-held or portable optical scanners are well-known in the art and various components thereof are disclosed in U.S. Pat. No. 5,552,597 of McConica for "Hand-Held Scanner having Adjustable Light Path", U.S. Pat. No. 5,586,212 of McConica, et al., for "Optical Wave Guide for Hand-Held Scanner," U.S. Pat. No. 5,381,020 of Kochis, et al., for "Hand-Held Optical Scanner with Onboard Battery Recharging Assembly," and U.S. Pat. No. 5,306,908 of McConica, et al., for "Manually Operated Hand-Held Optical Scanner with Tactile Speed Control Assembly," all of which are hereby incorporated by reference for all that they disclose.

A typical hand-held optical scanner may include an illumination system and an optical system. The illumination system illuminates the object and the optical system collects light reflected by the illuminated object and focuses a small area of the illuminated object, usually referred to as a "scan region" or "scan line," onto the surface of a photosensitive detector positioned within the scanner. Image data representative of the entire object then may be obtained by sweeping the illuminated scan line across the entire object, usually by moving the hand-held scanner with respect to the object. By way of example, the illumination system may include a light source (e.g., a fluorescent or incandescent lamp or an array of light emitting diodes (LEDs)). The optical system may include a lens and/or mirror assembly to focus the image of the illuminated scan line onto the surface of the detector.

The photosensitive detector used to detect the image light focused thereon by the optical system may be a charge-coupled device (CCD), although other devices may be used. A typical CCD may comprise an array of individual cells or "pixels," each of which collects or builds-up an electrical charge in response to exposure to light. Since the quantity of the accumulated electrical charge in any given cell or pixel is related to the intensity and duration of the light exposure, a CCD may be used to detect light and dark spots on an image focused thereon.

Hand-held optical scanners may be provided with additional utility if they can be made to scan documents without the necessity to move the scanner over the surface of the object being scanned.

SUMMARY OF THE INVENTION

An articulated reactor according to the present invention may comprise a generally rectangular member having a longitudinal axis, a transverse axis, an elongate inlet side, and an elongate outlet side. The articulated reactor also comprises a raised portion that extends along a direction that is generally parallel to the longitudinal axis and at least one slot that extends from about the elongate outlet side to about the elongate inlet side. The slot forms at least two fingers, the raised portions of which are biased against a roller associated with a scanner device when the scanner device is positioned adjacent the articulated reactor.

A paper feed device for allowing a hand-held scanner device to be operated in a paper feed mode may comprise a base member sized to receive the hand-held scanner device and an articulated reactor mounted to the base member. The articulated reactor may include a generally rectangular member having a longitudinal axis, a transverse axis, an elongate inlet side, and an elongate outlet side. A raised portion extends along a direction that is generally parallel to the longitudinal axis and at least one slot extends from about the elongate outlet side to about the elongate inlet side. The slot forms at least two fingers. The raised portion of each of the fingers is biased against the roller of the hand-held scanner device when the scanner device is positioned in the base member.

Also disclosed is a method for operating a hand-held scanner device in a paper feed mode that comprises the steps of providing a paper feed device having the articulated reactor, positioning the hand-held scanner device in the paper feed device so that the roller of the hand-held scanner contacts the fingers of the articulated reactor, and feeding a document to be scanned into a nip defined between the roller and the fingers of the articulated reactor.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
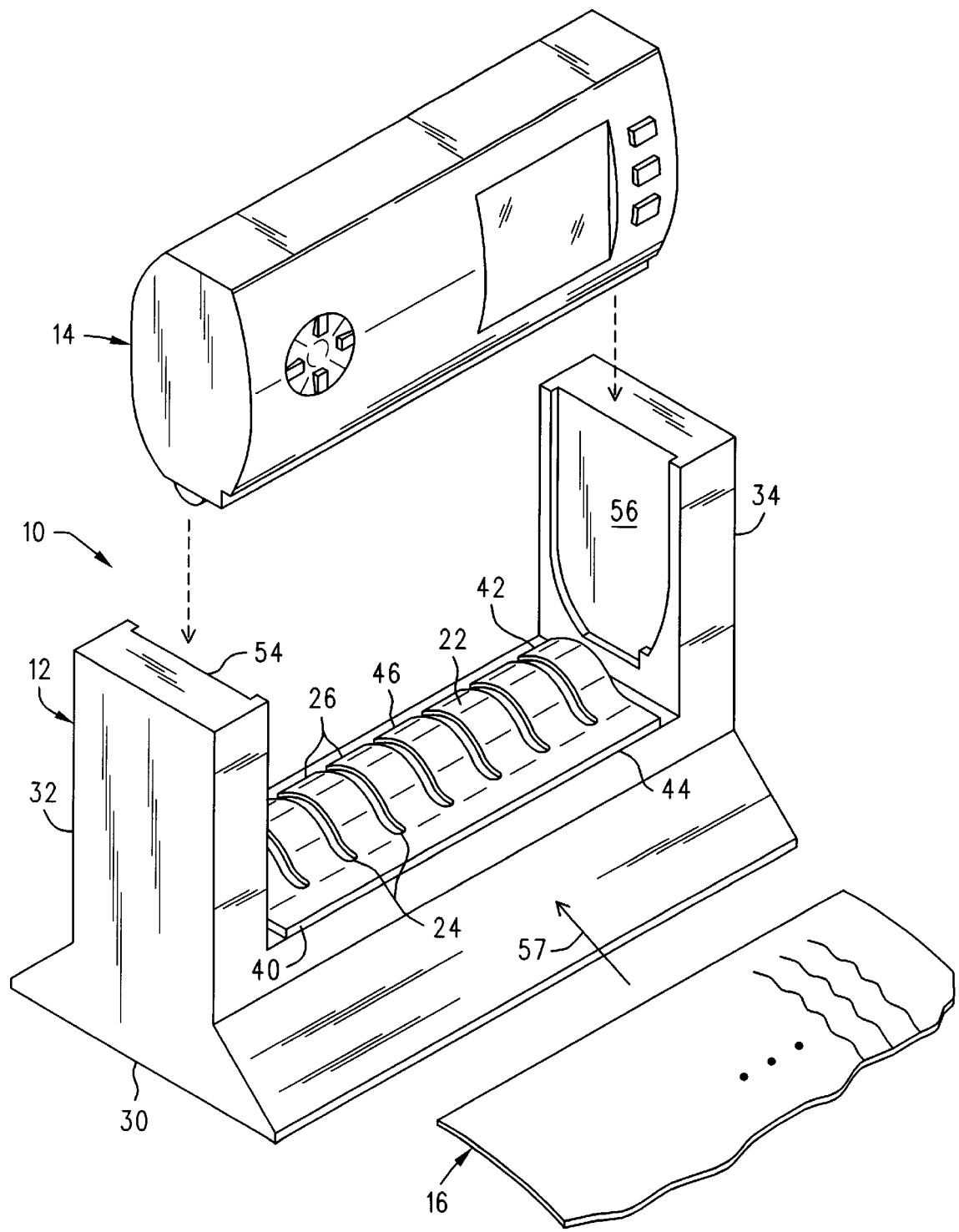
FIG. 1 is a perspective view of an articulated reactor according to the present invention as it may be used in conjunction with a paper feed device for a hand-held optical scanner device.

An articulated reactor 10 according to the present invention is shown in FIG. 1 as it could be used in conjunction with a paper feed device 12. The paper feed device 12 may be configured to receive a hand-held or other portable scanner device 14 to allow the hand-held scanner device 14 to be operated in a paper feed mode. In the paper feed mode, the hand-held scanner device 14 may remain stationary while the document 16 to be scanned is fed into the paper feed device 12 and moved underneath the hand-held scanner device 14.

Figure 2:
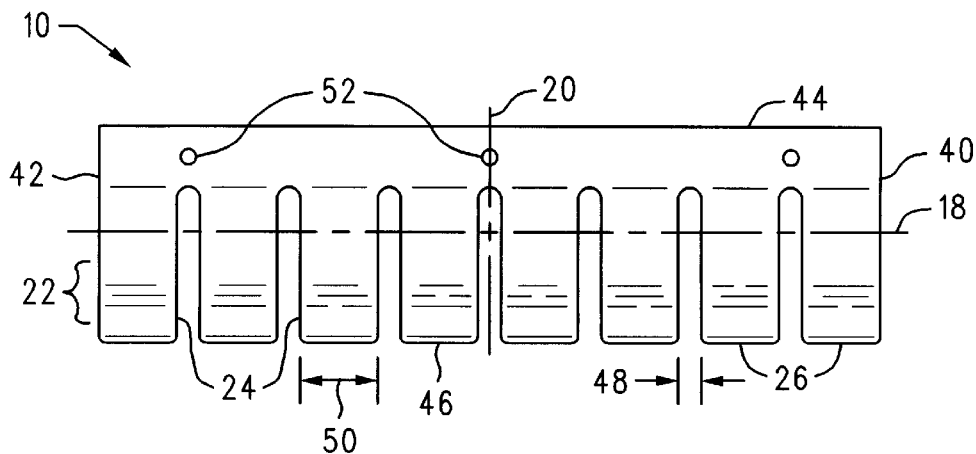
FIG. 2 is a plan view of the articulated reactor shown in FIG. 1.

In one preferred embodiment, the articulated reactor 10 may comprise a generally rectangularly-shaped member having a longitudinal axis 18 and a transverse axis 20 (FIG. 2). The articulated reactor 10 includes a raised portion 22 that extends along a direction that is substantially parallel to the longitudinal axis 18. A plurality of slots 24 form a plurality of fingers 26 which are biased against a roller 28 associated with the hand-scanner device 14 when the same is positioned in the paper feed device 12. See FIG. 3.

Figure 3:
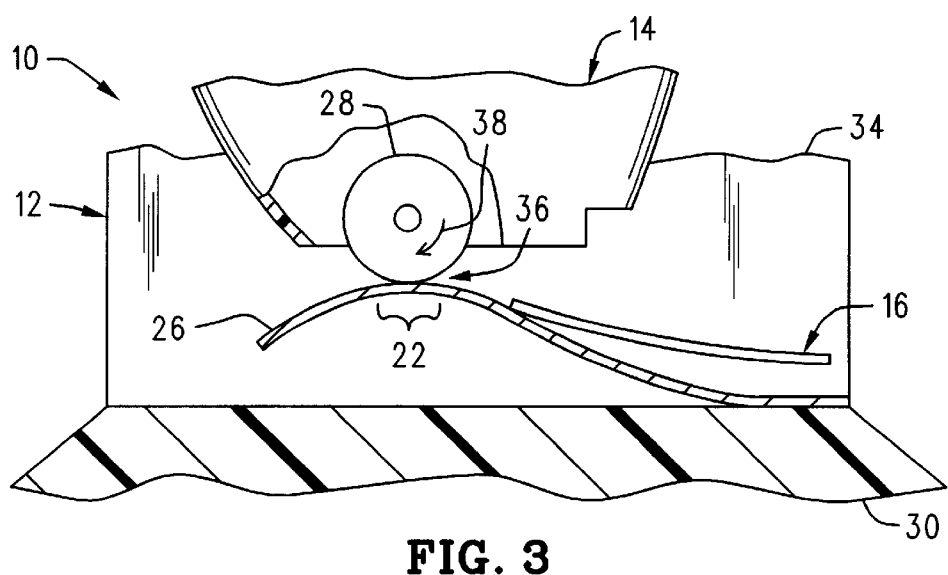
FIG. 3 is a sectional view in elevation showing the nip formed between the roller of the hand-held optical scanner device and the articulated reactor.

In one preferred embodiment of the present invention, the paper feed device 12 may comprise a base member 30 sized to receive the hand-held scanner device 14 and the articulated reactor 10, as best seen in FIG. 1. The base member 30 may also include a pair of vertical side members 32, 34 sized to engage and hold the hand-held scanner device 14. When the hand-held scanner device 14 is positioned within the paper feed device 12, a roller 28 associated with the hand-held scanner device 14 contacts and slightly displaces toward the base member 30 the raised portions 22 of the various fingers 26 of the articulated reactor 10 (FIG. 3). The various fingers 26 are therefore biased against the roller 28. The document 16 to be scanned may then be fed into the nip 36 formed between the roller 28 and the various fingers 26 of the articulated reactor 10. Thereafter, the hand-held scanner device 14 may be activated to scan the document 16. For example, upon activation, the roller 28 of the hand-held scanner device 14 rotates in the direction indicated by arrow 38. The rotating roller 28 draws the document 16 to be scanned into the nip 36, allowing the optical system (not shown) associated with the hand-held scanner device 14 to record image data from the document 16.

A significant advantage of the articulated reactor 10 according to the present invention is that the plurality of fingers 26 apply substantially even pressure along the length of the roller 28, thereby significantly reducing the likelihood of document mis-feeds and the possibility that the document 16 will not be pulled evenly by the roller 28, such as may be caused by small variations in the diameter of the roller 28 along its length. Another advantage of the present invention is that it provides a generous document lead-in area, thus easing the task of aligning and feeding the document 16 into the nip 36. Still yet another advantage of the present invention is that the articulated reactor 10 may be made from any of a wide variety of materials, from various metals and metal alloys, to moldable thermoplastic materials; the latter materials offering the opportunity to integrally mold the articulated reactor 10 with the base member 30 of the paper feed device 12.

Having briefly described the articulated reactor 10 according to the present invention, along with some of its more significant features and advantages, the articulated reactor 10 will now be described in detail. However, before proceeding with the detailed description, it should be noted that the articulated reactor 10 may be used in any of a wide range of paper feed devices suitable for use with any of a wide variety of hand-held scanner devices. Also, the present invention may be used other applications wherein it is desirable to feed paper or other thin, sheet-like materials into a device having a rotating roller. Consequently, the present invention should not be regarded as limited to use with the particular paper feed device and hand-held scanner device combination shown and described herein.

Referring back now to FIG. 1, the articulated reactor 10 according to one preferred embodiment of the present invention is shown as it could be used with a paper feed device 12 designed to receive a hand-held scanner device 14. The hand-held scanner device 14 may comprise any of a wide variety of hand-held scanner devices currently well-known or that may be developed in the future that utilize a rotating (usually motor-driven) roller 28 to assist a user (not shown) in moving the hand-held scanner over the document 16 to be scanned. By way of example, in one preferred embodiment the hand-held scanner 14 may comprise a hand-held scanner of the type shown and described in U.S. Pat. No. 5,586,212, which was incorporated by reference above. Alternatively, other types of hand-held scanners may be used.

The articulated reactor 10 may comprise a generally rectangular member having a longitudinal axis 18 and a transverse axis 20, as best seen in FIG. 2. A proximal end 40 and a distal end 42 are generally parallel to the transverse axis 20, while an elongate inlet side 44 and an elongate outlet side 46 are generally parallel to the longitudinal axis 18. The articulated reactor 10 includes a raised portion 22 that extends along a direction that is generally parallel to the longitudinal axis 18. As will be described in greater detail below, the raised portion 22 allows the various fingers 26 of the articulated reactor 10 to contact the roller 28 of the hand-held scanner device 14 and also provides a surface for supporting the document 16 to allow the same to be imaged by the optical system (not shown) of the hand-held scanner device 14.

Referring now primarily to FIG. 2, the articulated reactor 10 includes at least one, and preferably a plurality of slots 24 that extend in a generally transverse direction (i.e., generally parallel to the transverse axis 20) from the outlet side 46 to about the inlet side 44. The slot or slots 24 form a plurality of fingers 26, each of which contacts the roller 28 associated with the hand-held scanner device 14, as is best seen in FIG. 3.

The various slots 24 allow each finger 26 to move generally independently of the others, which helps to compensate for any lengthwise variations in the diameter of the roller 28. Consequently, the plurality of fingers 26 tends to improve the draw-in performance of the roller/articulated reactor combination and substantially reduces the likelihood that the document 16 will not be drawn evenly during the scan operation. Since the fingers 26 support the document 16 from underneath the hand-held scanner device 14, including in the area of the scan region 60 (FIG. 4), it is preferred that the slots 24 have relatively narrow widths 48 to minimize the portion of the document 16 that is un-supported by the various fingers 26 of the articulated reactor 10. In one preferred embodiment, the width 48 of each slot 26 may be in the range of about 0.1 mm to about 3 mm (2 mm preferred). The width 50 of each finger 26 may be in the range of about 3 mm to about 5 mm (4 mm preferred).

The articulated reactor 10 may also include one or more mounting holes 52 sized to receive an appropriate fastener (e.g., a screw or a rivet) to allow the articulated reactor 10 to be mounted to the base member 30 of paper feed device 12. Alternatively, the articulated reactor 10 could be attached to the base 30 of paper feed device 12 by other means, such as by any of a wide range of suitable adhesives. In still another alternative embodiment, the articulated reactor 10 may be molded as an integral part of the base 30 of paper feed device 12, if the same are fabricated from a moldable thermoplastic material.

The articulated reactor 10 may be made from any of a wide variety of materials, such as metals or metal alloys (e.g., a beryllium-copper alloy), that provide the resiliency required to allow the individual fingers 26 to be biased toward the roller 28, yet be displaced away from the roller 28 by the document 16. See FIGS. 3 and 4. If metals or metal alloys are used, then it may be desirable to coat at least the fingers 26 of the articulated reactor 10 with a material having a low coefficient of friction (e.g., Teflon®) to allow the document 16 to slide more easily along the fingers 26 as it is drawn over the same during the scanning operation. Alternatively, the articulated reactor 10 may be fabricated from any of a wide variety of moldable thermoplastic materials (e.g., nylon, polycarbonate, or ABS). This latter alternative allows for the possibility of molding the articulated reactor 10 as an integral part of the base member 30.

As was briefly mentioned above, the articulated reactor 10 may be used in conjunction with a paper feed device 12 to allow the hand-held scanner device 14 to be operated in a paper feed mode. As used herein, the term "paper feed mode" refers to a mode of operation wherein a hand-held scanner may be used to scan a document 16 by moving the document 16 under the hand-held scanner device 14, as opposed to moving the hand-held scanner device 14 over the document, as is the conventional mode for hand-held scanner devices. As will be described in greater detail below, scanning in the paper feed mode is accomplished by the motorized roller 28 which draws the document 16 into the nip 36 defined between the roller 28 and the raised portion 22 of the various fingers 26 of the articulated reactor 10.

Referring now primarily to FIG. 1, one embodiment of the paper feed device 12 may comprise an elongate base member 30 sized to receive the particular hand-held scanner device 14 that is to be operated in the paper feed mode. The articulated reactor 10 should be similarly sized so that it extends along substantially the full length of the roller 28 associated with the hand-held scanner device 14. See FIG. 1. The paper feed device 12 may also include a pair of vertical side members 32, 34 sized to receive the scanner device 14 so that the same may be easily engaged with and disengaged from the paper feed device 12 to allow the scanner device 14 to be operated in either the hand-held mode or the paper feed mode. Toward this end, each vertical side member 32, 34 may include a respective recessed portion 54, 56, suitable for allowing the paper feed device 12 to engage and hold the scanner device 14. Alternatively, the paper feed device 12 may be provided with other features, such as pins or tabs (not shown) suitable for engaging the particular hand-held scanner device 14 that is to be used. In any event, the recessed portions 54, 56 or other holding features incorporated into the paper feed device 12 should position the hand-held scanner device 14 so that the roller 28 associated with the same contacts the raised center section 22 of the various fingers 26 of the articulated reactor 10. See FIG. 3. The paper feed device 12 also may be provided with a suitable discharge guide (not shown) to route the document 16 to an appropriate discharge area after the scanning operation.

It should be noted that the configuration of the paper feed device 12 will depend to a large extent on the type and style of the particular hand-held scanner device that is to be used therewith. Therefore, the present invention should not be regarded as limited to a paper feed device 12 of the type shown and described herein.

Figure 4:
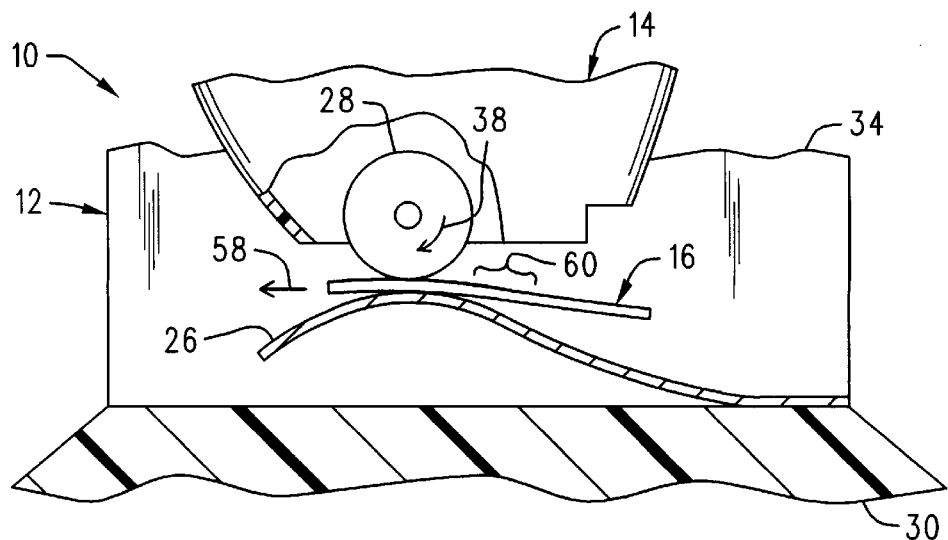
FIG. 4 is a sectional view in elevation showing the document being drawn between the roller of the hand-held optical scanner device and the articulated reactor.

The articulated reactor 10 allows the hand-held scanner device 14 to be operated in a paper feed mode. Assuming that a paper feed device 12 has been provided, the hand-held scanner device 14 would first be positioned within the paper feed device 12 so that it is securely held thereby. For example, in one preferred embodiment, the paper feed device 12 includes a pair of vertical side members 32, 34 with respective recessed areas 54, 56 sized to engage and hold the hand-held scanner device 14. See FIG. 1. When the hand-held scanner device 14 has been properly positioned within the paper feed device 12, the raised portions 22 of the various fingers 26 will be slightly biased against the roller 28 associated with the hand-held scanner device 14. See FIG. 3. A document 16 may then be scanned by inserting the document 16 from the inlet side 44 of the articulated reactor 10 (i.e., generally in the direction of arrow 57 in FIG. 1) and into the nip 36 defined between the roller 28 and the raised portion 22 of the various fingers 26 of the articulated reactor 10. Thereafter, the hand-held optical scanner device 14 may be activated to scan the document 16. For example, in one preferred embodiment, the hand-held scanner device 14 rotates the roller 28 in the direction indicated by arrow 38, which draws-in the document 16 and moves it generally in the discharge direction 58 (FIG. 4). That is, the document 16 is scanned as if the hand-held scanner device 14 were being moved over the document 16.

It should be noted that the foregoing method may vary to some extent depending on the operational requirements of the particular hand-held scanner device being used. Consequently, the present invention should not be regarded as limited to the particular sequence described above for activating the hand-held scanner device 14.

Figure 5:
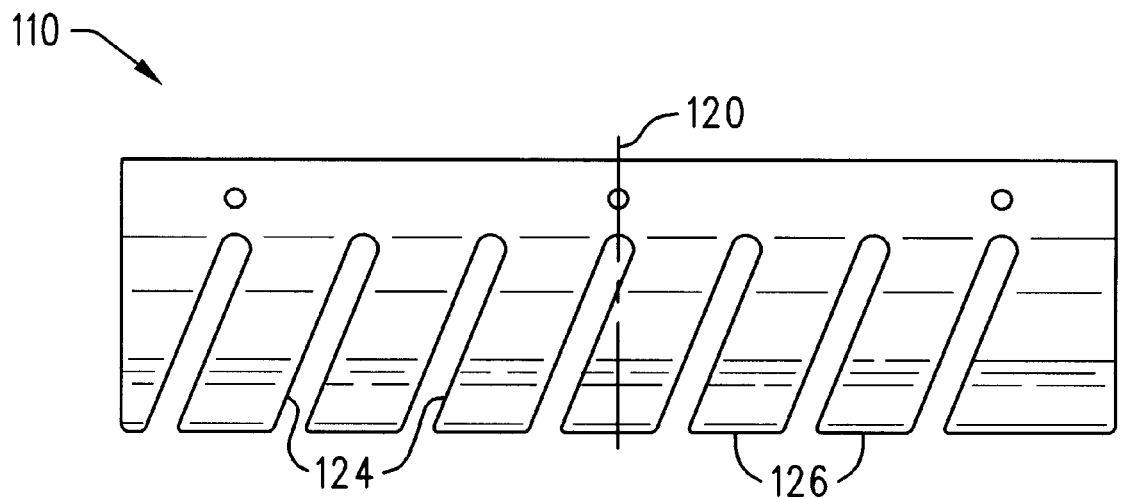
FIG. 5 is a plan view of a second embodiment of the articulated reactor according to the present invention.

A second embodiment 110 of an articulated reactor according to the present invention is shown in FIG. 5. Essentially, the second embodiment 110 is identical to the first embodiment 10, except that the slots 124 are oriented at angles that are oblique to the transverse axis 120. The oblique slots 124 create a plurality of fingers 126.

Figure 6:
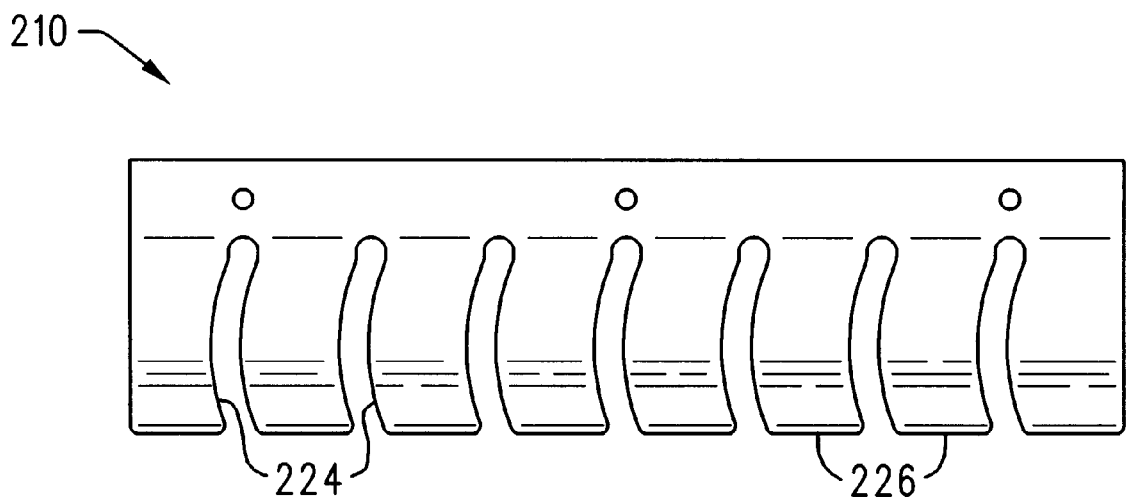
FIG. 6 is a plan view of a third embodiment of the articulated reactor according to the present invention.

A third embodiment 210 of an articulated reactor according to the present invention is shown in FIG. 6. The third embodiment 210 is similar to the first two embodiments 10 and 110, except that it includes a plurality of curved slots 224. The curved slots 224 divide the articulated reactor 210 into a plurality of fingers 226. Actually, the articulated reactor according to the present invention could be provided with any number of a wide range of slot shapes and configurations which divide the articulated reactor into a plurality of fingers. Consequently, the present invention should not be regarded as limited to an articulated reactor having any particular slot shape or configuration.

It is contemplated that the inventive concepts herein described may be variously otherwise embodied and it is intended that the appended claims be construed to include alternative embodiments of the invention except insofar as limited by the prior art.

What is claimed is:

1. An articulated reactor comprising a generally rectangular member having a longitudinal axis, a transverse axis, an elongate inlet side, and an elongate outlet side, the elongate inlet and outlet sides being generally parallel to the longitudinal axis, said articulated reactor also comprising a raised portion extending along a direction that is generally parallel to the longitudinal axis and at least one slot extending from about the elongate outlet side to about the elongate inlet side, said slot forming at least two fingers, wherein each of said fingers is biased against a roller associated with a scanner device when the scanner device is positioned adjacent said articulated reactor, each of said fingers urging a document being scanned against the roller during a scanning operation.

2. The articulated reactor of claim 1, further comprising a plurality of slots extending from the elongate outlet side to about the elongate inlet side, said plurality of slots forming a plurality of fingers.

3. The articulated reactor of claim 2, wherein said plurality of slots are generally parallel to one another.

4. The articulated reactor of claim 3, wherein each of said plurality of slots extend along a direction that is generally parallel to the transverse axis.

5. The articulated reactor of claim 4, wherein said articulated reactor comprises a resilient material.

6. The articulated reactor of claim 5, wherein said resilient material comprises a copper alloy.

7. The articulated reactor of claim 5, wherein said resilient material comprises a moldable thermoplastic material.

8. The articulated reactor of claim 1, wherein said elongate inlet side is adapted to be attached to a base member.

9. The articulated reactor of claim 8, wherein said slot has a width of in the range of about 0.1 mm to about 3 mm.

10. A paper feed device for allowing a hand-held scanner device to be operated in a paper feed mode, the hand-held scanner device including a roller mounted for rotation in the hand-held scanner device, comprising:

a base member sized to receive the hand-held scanner device; and an articulated reactor mounted to said base member, said articulated reactor including a generally rectangular member having a longitudinal axis, a transverse axis, an elongate inlet side, and an elongate outlet side, the elongate inlet and outlet sides being generally parallel to the longitudinal axis, said articulated reactor also comprising a raised portion extending along a direction that is generally parallel to the longitudinal axis and at least one slot extending from about the elongate outlet side to about the elongate inlet side, said slot forming at least two fingers, wherein each of said fingers is biased against the roller of the hand-held scanner device when the scanner device is positioned in said base member, each of said fingers urging a document being scanned against the roller during a scanning operation.

11. The paper feed device of claim 10, wherein said articulated reactor further comprises a plurality of slots extending from the elongate outlet side to about the elongate inlet side, said plurality of slots forming a plurality of fingers.

12. The paper feed device of claim 11, wherein said plurality of slots are generally parallel to one another.

13. The paper feed device of claim 12, wherein each of said plurality of slots extends in a direction that is substantially parallel to the transverse axis.

14. The paper feed device of claim 13, wherein the elongate inlet side of said articulated reactor is attached to said base member.

15. The paper feed device of claim 14, wherein said base member further comprises a pair of vertical side members for engaging the hand-held scanner device, wherein said pair of vertical side members hold the hand-held scanner device so that the roller is urged toward said articulated reactor during a scanning operation.

16. A method for operating a hand-held scanner device in a paper feed mode, the hand-held scanner device including a roller mounted for rotation in the hand-held scanner device, comprising the steps of:

providing a paper feed device sized to receive the hand-held scanner device, the paper feed device including an articulated reactor having a longitudinal axis, a transverse axis, an elongate inlet side, and an elongate outlet side, the elongate inlet and outlet sides being generally parallel to the longitudinal axis, said articulated reactor also comprising a raised portion extending along a direction that is generally parallel to the longitudinal axis and at least one slot extending from about the elongate outlet side to about the elongate inlet side, said slot forming at least two fingers;

positioning the hand-held scanner device in the paper feed device so that the roller of the hand-held scanner device contacts the fingers of the articulated reactor; and feeding a document to be scanned into a nip defined between the roller of the hand-held scanner device and the fingers of the articulated reactor.

17. The method of claim 16, further comprising the step of activating the hand-held scanner device to scan the document.

* * * * *